US011921620B2

(12) United States Patent
Varada et al.

(10) Patent No.: US 11,921,620 B2
(45) Date of Patent: Mar. 5, 2024

(54) GENERATING A VISUALIZATION OF BLOCKS OF CODE STATEMENTS RELATED TO ERRORS IN A LOG FILE (71) Applicant: International Business Machines Corporation, Armonk, NY (US)

(72) Inventors: Sri Harsha Varada, Vizianagaram (IN); Lakshmi Soumya Suggala, Visakhapatnam (IN); Sarbajit K. Rakshit, Kolkata (IN); Venkata Vara Prasad Karri, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 17/481,011

(22) Filed: Sep. 21, 2021

(65) Prior Publication Data
US 2023/0088164 A1 Mar. 23, 2023

(51) Int. Cl.
G06F 11/36 (2006.01)
G06F 8/73 (2018.01)
G06F 8/75 (2018.01)
G06T 13/80 (2011.01)

(52) U.S. Cl.
CPC ............ G06F 11/3664 (2013.01); G06F 8/73 (2013.01); G06F 8/75 (2013.01); G06F 11/3692 (2013.01); G06T 13/80 (2013.01); G06T 2200/24 (2013.01)

(58) Field of Classification Search
CPC .... G06F 11/3664; G06F 11/3692; G06F 8/73; G06F 8/75; G06T 13/80; G06T 2200/24
See application file for complete search history.

(56) References Cited

U.S. PATENT DOCUMENTS

| 5,517,663 | A | * | 5/1996 | Kahn | G06F 11/323 714/E11.181 |
| 7,577,955 | B2 | | 8/2009 | Wood-Gaines et al. | |
| 10,528,454 | B1 | * | 1/2020 | Baraty | G06F 11/3684 |
| 10,635,566 | B1 | * | 4/2020 | Talluri | G06F 9/4488 |

(Continued)

OTHER PUBLICATIONS

"An Animation Logs for GUI" an IP.com Prior Art Database Technical Disclosure, IP.com No. IPCOM000232458D, dated Dec. 7, 2018, Total 5 pages.

(Continued)

Primary Examiner — S. Sough
Assistant Examiner — Stephen D Berman
(74) Attorney, Agent, or Firm — Konrad, Raynes, Davda & Victor LLP; David W. Victor (57) ABSTRACT Provided are a computer program product, system, and method for generating a visualization of blocks of code statements related to errors in a log file. A log file logs errors in execution of program code. Source code, from which the program code is compiled, is analyzed to determine blocks of statements in the source code whose execution resulted in the errors in the log file. Blocks of statements in the source code are annotated with the errors in the log file caused by the blocks of statements. Execution of a block of statements annotated with an error resulted in the error logged in the log file. The annotated blocks of statements are processed to generate a video providing a visualization of the blocks of statements in the source code whose execution resulted in the errors.

17 Claims, 5 Drawing Sheets (56) References Cited

U.S. PATENT DOCUMENTS

| | | | |
|---|---|---|---|
| 2011/0161938 A1* | 6/2011 | Marum | G06F 8/77 |
| | | | 707/706 |
| 2013/0227350 A1 | 8/2013 | Oriordan et al. | |
| 2013/0298110 A1* | 11/2013 | Boden | G06F 11/3676 |
| | | | 717/125 |
| 2015/0347094 A1* | 12/2015 | Lattner | G06F 8/42 |
| | | | 717/109 |
| 2016/0306627 A1* | 10/2016 | Hewitt | G06F 8/73 |
| 2017/0300401 A1 | 10/2017 | K et al. | |
| 2020/0301817 A1 | 9/2020 | Davis et al. | |
| 2020/0357301 A1* | 11/2020 | Groner | G06F 8/33 |
| 2021/0357192 A1* | 11/2021 | Deng | G06F 8/437 |

OTHER PUBLICATIONS

Anonymous "Trace Log Playbook Apparatus" an IP.com Prior Art Database Technical Disclosure, IP.com No. IPCOM000177245D, , dated Nov. 11, 2013, Total 3 pages.

G. Wilkinson, "How-To Videos Log Files Made Clear and Debugging Tips and Tricks" dated Mar. 27, 2018, (online) retrieved from the Internet at URL>https://www.anylogic.com/blog/, Total 2 pages.

"P. To Create A Animated Video File Analysis Results" (online) retrieved from the Internet on Aug. 30, 2021 from URL>https://docs.bentley.com/LiveContent/web/STAAD.Pro . . . Total 1 page.

Yoon "Backtracking Support in Code Editing" dated May 2015, CMU-ISR-15-103, Institute for Software Research, Total 231 pages.

* cited by examiner

GENERATING A VISUALIZATION OF BLOCKS OF CODE STATEMENTS RELATED TO ERRORS IN A LOG FILE

BACKGROUND OF THE INVENTION

1. Field of the Invention

The present invention relates to a computer program product, system, and method for generating a visualization of blocks of code statements related to errors in a log file.

2. Description of the Related Art

In software development, the developer will analyze log files containing logged errors to determine the source of errors in order to determine whether changes need to be made to the program source code. Further, during application deployment, a log file may be generated that list errors that occur that may be disruptive to the user experience. The developer or user will have to analyze the log file to determine the source of the errors and corrective actions to implement. The developer may examine the log file to determine whether changes to the source code are necessary and a user may review a log file of errors to determine the type of corrective action that may be appropriate, such as downloading a program update or notifying the company of the errors. Log files are difficult to review because they can have hundreds of entries of errors with abbreviated explanations that may not convey the source of the problem.

There is a need in the art for improved techniques for assisting application developers and users in understanding logged errors in log files.

SUMMARY

Provided are a computer program product, system, and method for generating a visualization of blocks of code statements related to errors in a log file. A log file logs errors in execution of program code. Source code, from which the program code is compiled, is analyzed to determine blocks of statements in the source code whose execution resulted in the errors in the log file. Blocks of statements in the source code are annotated with the errors in the log file caused by the blocks of statements. Execution of a block of statements annotated with an error resulted in the error logged in the log file. The annotated blocks of statements are processed to generate a video providing a visualization of the blocks of statements in the source code whose execution resulted in the errors.

DETAILED DESCRIPTION

The described embodiments provide improvements to computer technology to assist a user or software developer in understanding the nature of generated errors, such as errors in the log file and how those errors relate to the underlying source code whose execution results in the errors. To allow the user to visualize the source of errors, described embodiments provide techniques for generating an animated video of the code statements whose execution resulted in selected errors to allow the user to observe in the video the code resulting in the logged errors. Further, if errors propagate when a problem multiplies, then the described embodiments may provide a visualization of the program statements that shows how the error propagated during execution.

Described embodiments provide improvements in computer technology for analyzing a log file to identify activity resulting in logged errors that is executed automatically based on the program logic and activity that is manually triggered by user input. The described embodiments create a visualization in the form of an animation video showing a flowchart of the code statements involved in producing the errors in the log file. The animations for the code statements resulting in errors that receive user input may include animations representing user input to visually direct the user's attention to errors related to user input, which are often the cause of logged errors.

Figure 1:
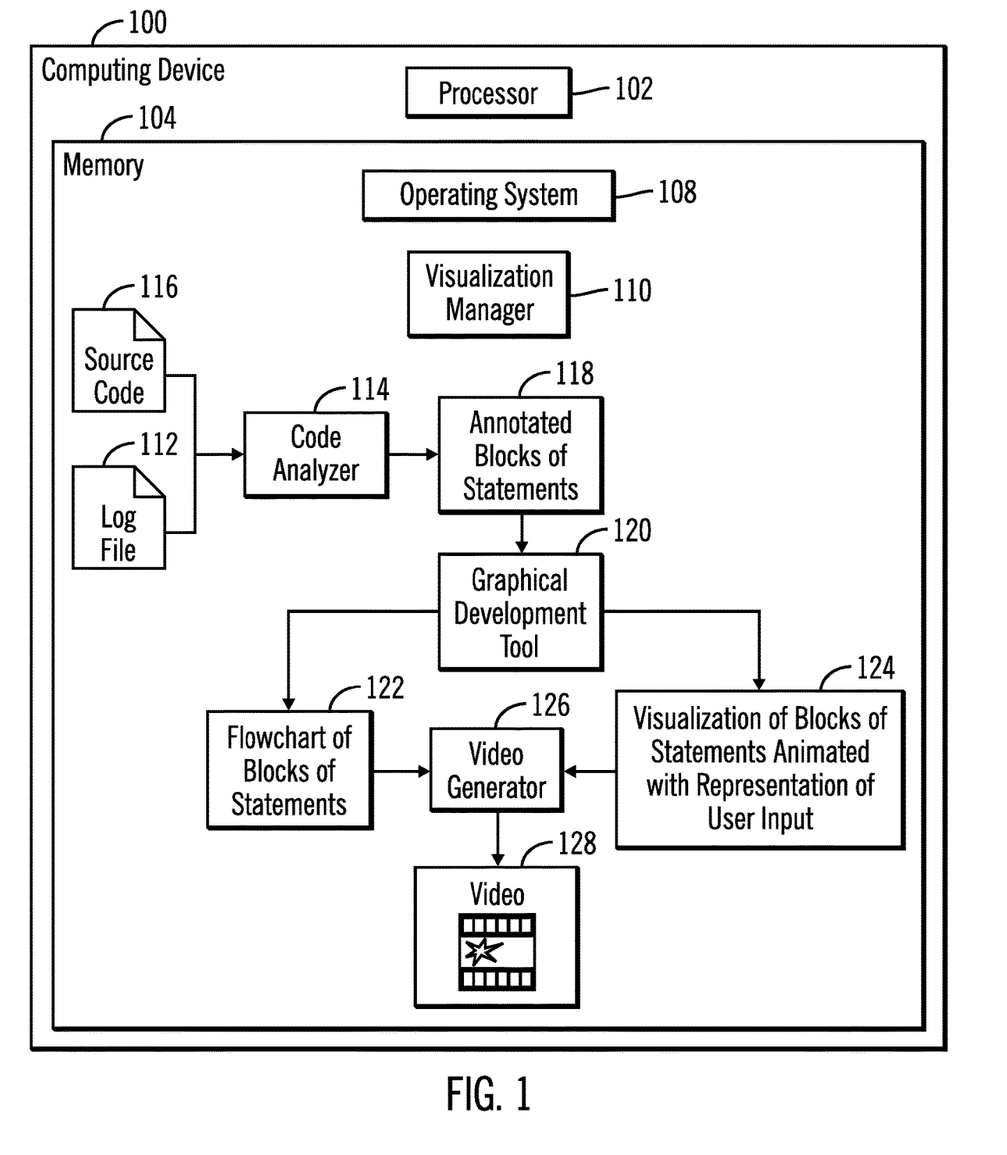
FIG. 1 illustrates an embodiment of a computing device in which embodiments are implemented.

FIG. 1 illustrates an embodiment of a computing device 100 in which embodiments are implemented. The computing device 100 includes a processor 102 and a main memory 104. The main memory 104 includes various program components and files including an operating system 108; a visualization manager 110 to manage the process to create video from the errors in a log file 112; a code analyzer 114 to process the errors in the log file 112 and source code 116, whose execution resulted in the logged errors, to determine the blocks of statements in the source code 116 whose execution resulted in the errors in the log file 114; annotated blocks of statements 118 produced by the code analyzer 114 including the blocks of statements whose execution resulted in the errors in the log file 112 annotated with the error statements in the log file 112; a graphical development tool 120 to process the annotated block of statements 118 and generate a flowchart 122 showing a flow of the blocks of statements and generate a visualization of the block of statements animated with a representation of user input 124; a video generator 126 to receive the flowchart 122 and visualization of block of statements animated with representation of user input 124 to generate frames of a video 128 animating the steps of the flowchart representing blocks of source code 116 statements resulting in logged errors and animating source code with graphics showing the statements involving user input that resulted in errors.

The memory 104 may comprise a suitable volatile or non-volatile memory devices, including those described above.

Generally, program modules, such as the program components 108, 110, 114, 120, 126 may comprise routines, programs, objects, components, logic, data structures, and so on that perform particular tasks or implement particular abstract data types. The program components and hardware devices of the computing device 100 of FIG. 1 may be implemented in one or more computer systems, where if they are implemented in multiple computer systems, then the computer systems may communicate over a network.

The program components 108, 110, 114, 120, 126 may be accessed by the processor 102 from the memory 104 to execute. Alternatively, some or all of the program components 108, 110, 114, 120, 126 may be implemented in separate hardware devices, such as Application Specific Integrated Circuit (ASIC) hardware devices.

The functions described as performed by the program 108, 110, 114, 120, 126 may be implemented as program code in fewer program modules than shown or implemented as program code throughout a greater number of program modules than shown.

Figure 2:
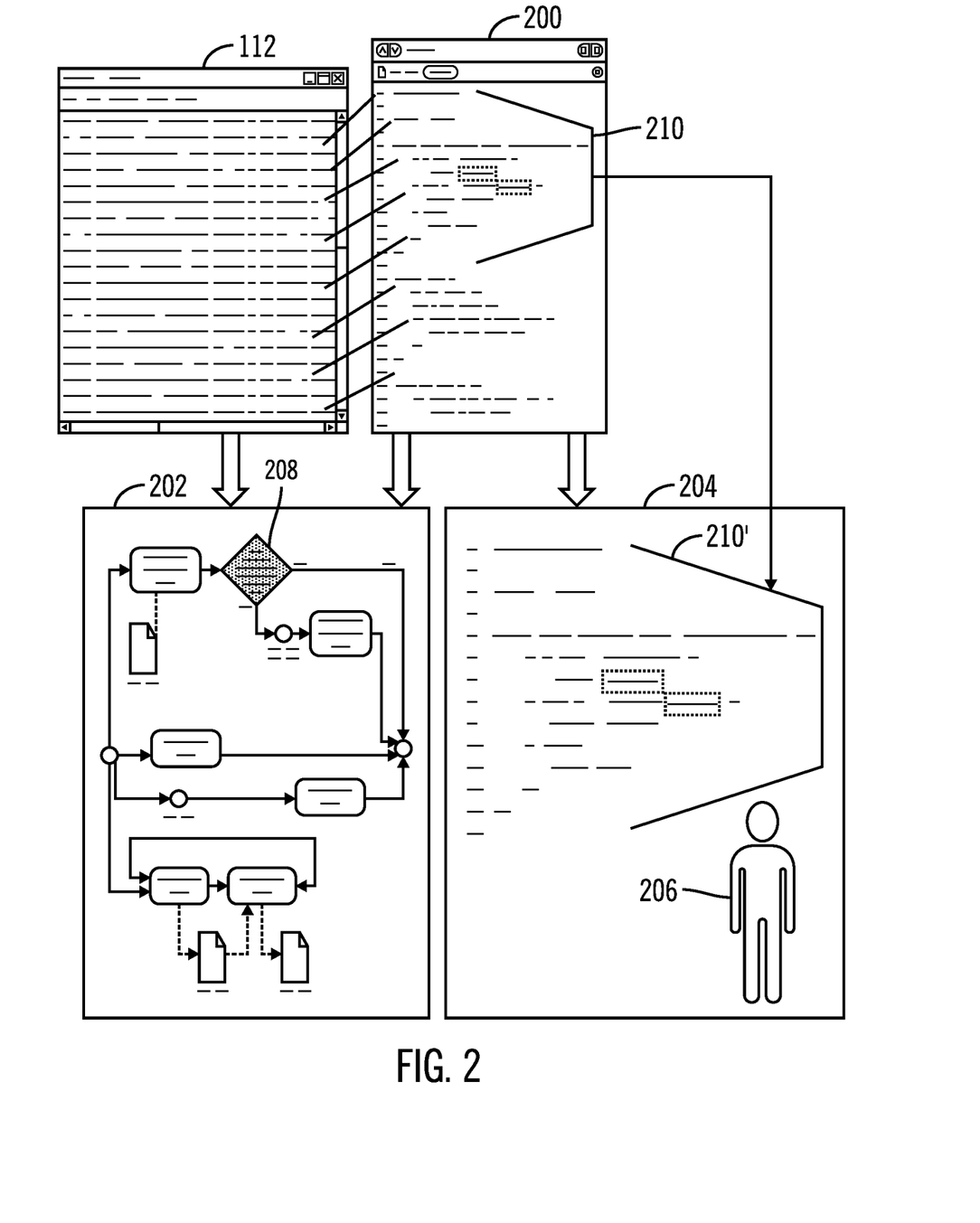
FIG. 2 illustrates an example of a log file, blocks of statements related to the errors in the log file annotated with log file errors, a flowchart generated to show the flow of blocks of statements in the source code related to the error, and a visualization of the source code with an avatar to symbolize manual input of information to the program.

FIG. 2 illustrates how a log file 112 of listed errors maps to blocks of statements in the source code 200, which will then be annotated with the errors in the log file 112. The graphical development tool receives the log file 112, user selection of errors in the log file 112, and blocks of statements 210 of source code 116 whose executed resulted in the user selected errors in the log file 112 to generate a flowchart 202 showing the flow of the blocks of statements resulting in producing the errors from the log file 112 selected by the user and generate a visualization 204, which may be implemented as a file or object, having the statements 210' whose execution resulted in the selected errors in the log file 112 with an animation of an avatar 206 for those blocks of statements 210' resulting in the user selected logged errors. The video generator 126 may generate frames showing the flowchart 202 followed by a frame 204 showing the visualization of the block of statements 210 animated with a representation of a user 206 representing user input received during execution of the block of statements 210'. Flowchart 202 shows one frame of the flowchart with the first step 208 in the flowchart highlighted and the next frame 204 is shown following the frame 202 to illustrate the block of statements 210' for a highlighted step 208 and user avatar 206 representing that user input is received during execution of the statements 210'. In this way, the user is provided a video 128 showing animation of the flow of statements 202 resulting in the selected errors and a graphic of a user 206 in a frame of statements 210' from the highlighted step 208 in the flowchart 202 at which user input is received to draw the user attention to those statements 210' resulting in an error where user input was received.

Figure 3A:
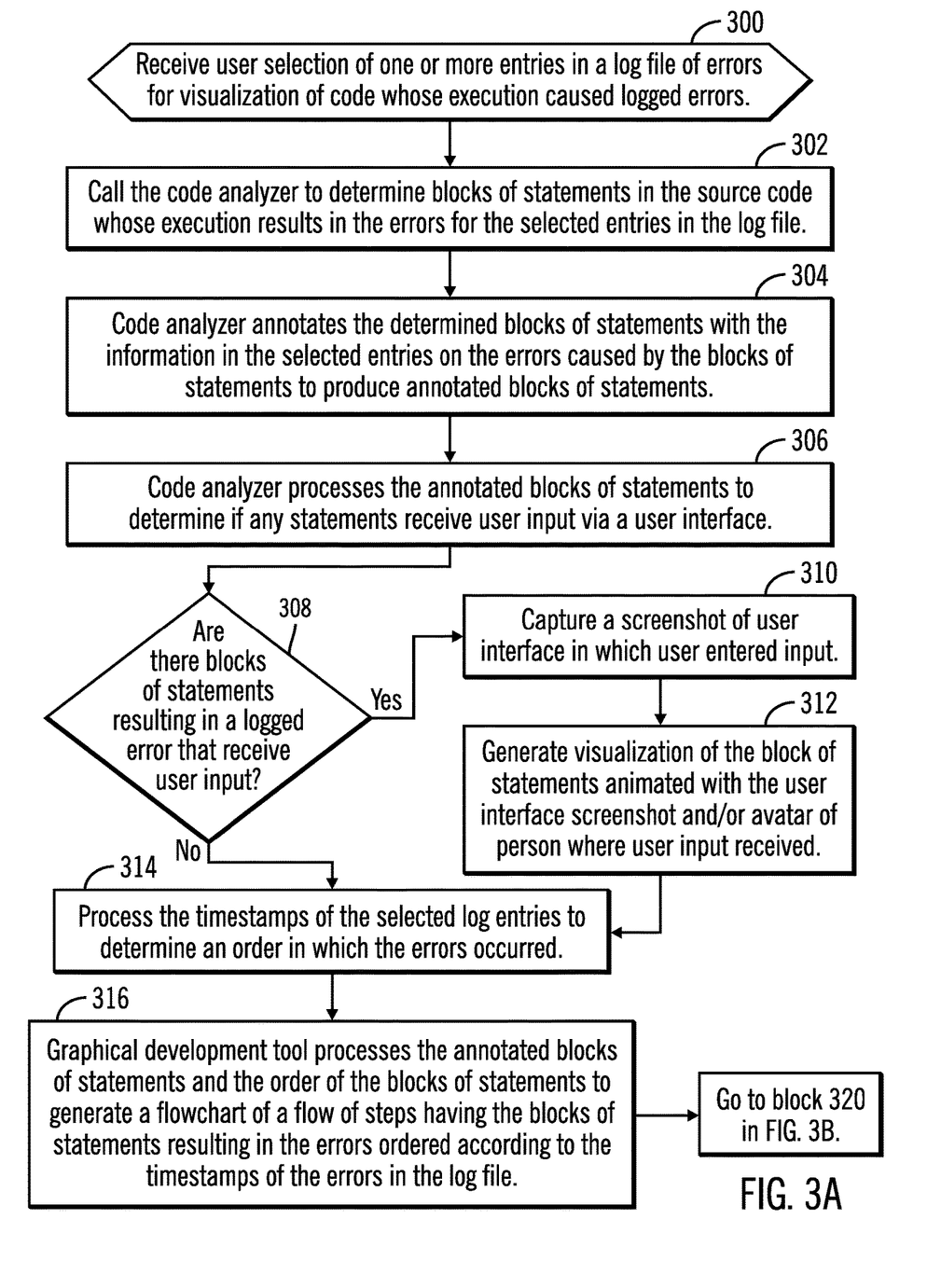
FIGS. 3*a* and 3*b* illustrate an embodiment of operations to generate a video comprising a visualization of blocks of statements of source code related to the errors in the log filed.
Figure 3B:
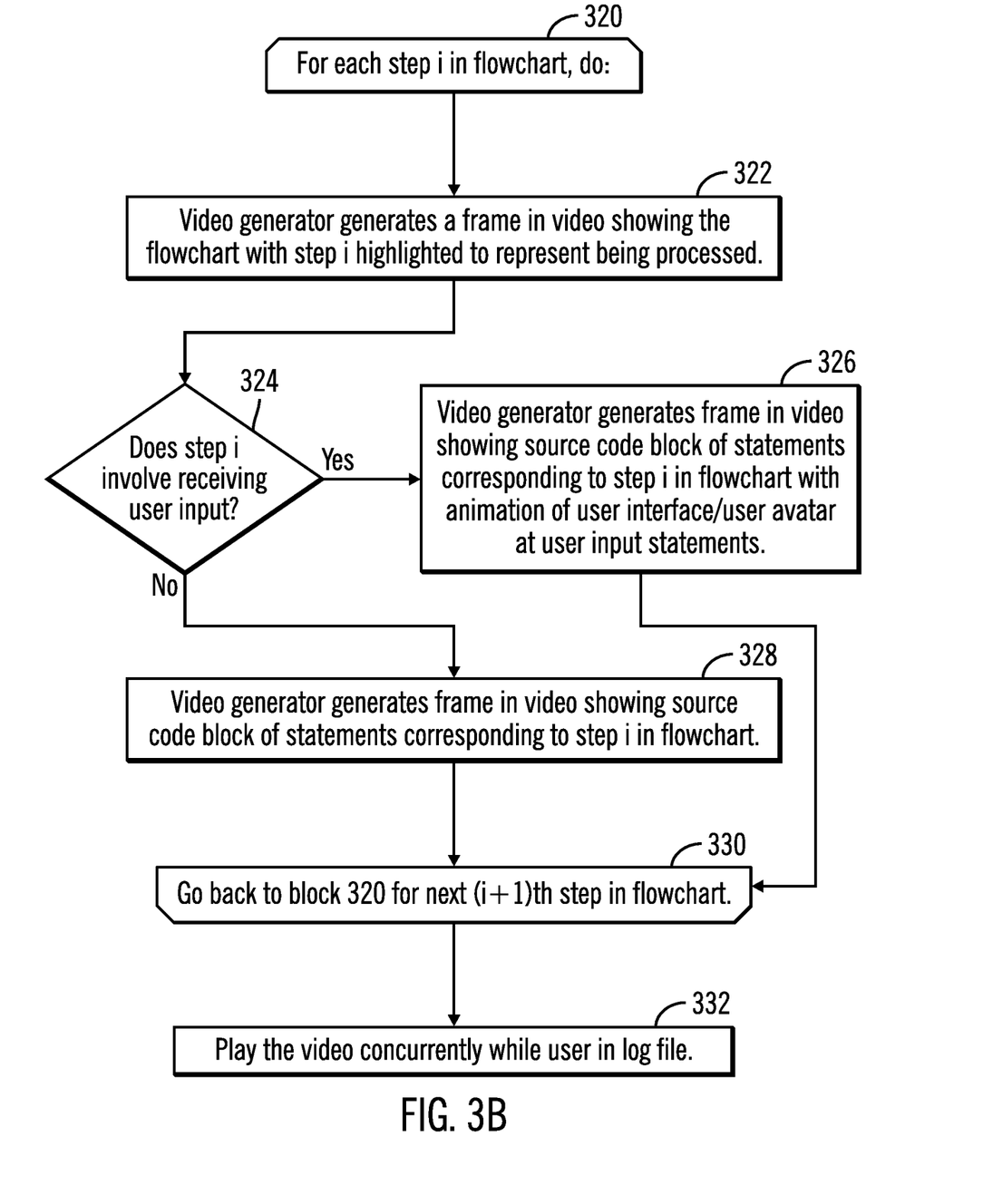

FIGS. 3a and 3b illustrate an embodiment of operations performed by the visualization manager 110, code analyzer 114, graphical development tool 120, and video generator 126 to generate video 128 providing a visualization of blocks of statements in source code whose execution contributed to selected errors in a log file 112. Upon receiving user selection of one or more error entries in the log file 112 of errors, which may comprise a selection of the entire log file 112 or a subset of the entries, the visualization manager 110 calls (at block 302) the code analyzer 114 to determine blocks of statements in the source code 116 whose execution results in the errors for the selected entries in the log file 112. The code analyzer 114 may use information in the selected entries in the log file 112 to identify the statements in the source code 116 whose execution resulted in the errors. The code analyzer 114 annotates (at block 304) the determined blocks of statements from the source code 116 with the information in the selected entries on the errors caused by the blocks of statements to produce annotated blocks of statements 118. The annotated blocks of statements 118 maps the errors in the log to the source code 116 whose execution resulted in the errors. The code analyzer 114 processes (at block 306) the annotated blocks of statements 118 to determine if any statements receive user input via a user interface.

If (at block 308) there are blocks of statements resulting in a logged error that receive user input, then a graphical development tool 120 captures (at block 310) a screenshot of a user interface in which a user entered input at the block of statements resulting in a logged error. An animation is generated (at block 312) in a visualization of the blocks of statements animated with a representation of user input 124 showing the user interface screenshot and/or an avatar of person adjacent to the block of statements where user input is received. If (at block 308) there are no blocks of statements resulting in an error where user input is received or after generating (at block 312) the visualization of the block of statements with an animation of user input 124, then the graphical development tool 120 processes (at block 314) the timestamps of the selected log entries to determine an order in which the errors occurred. The graphical development tool 120 processes (at block 316) the annotated blocks of statements 118 and the order of the blocks of statements to generate a flowchart 122 showing a flow of steps having the blocks of statements resulting in the errors in the selected entries of the log file 112. Each step of the flowchart 122 may comprise one or more of the statements in a block of statements resulting in one of the selected errors. The steps in the flow chart having the statements resulting in the errors may be ordered according to the timestamps of the errors in the error entries in the log file. Control then proceeds to block 320 in FIG. 3b.

A loop of operations is performed from blocks 320 to 328 for each step i in the flowchart 122. The video generator 126 generates (at block 322) a frame in a video stream 128 showing the flowchart 122 with step i highlighted to represent that step is currently being processed. If (at block 324) the step i involves receiving user input, then the video generator 126 generates (at block 326) a frame in the video stream 128 showing source code block of statements corresponding to step i in the flowchart 122 with the animation of the user interface screenshot and/or an avatar of a person to represent user input for the block of statements represented in highlighted step i. If (at block 324) step i in the flowchart 122 does not receive user input, then the video generator 126 generates (at block 328) a frame in the video stream 128 showing source code block of statements corresponding to step i in the flowchart 122. After generating the frame showing the corresponding source code at block 326 or 328, control proceeds (at block 330) back to block 320 to process the next step (i+1) in the flowchart 122 if there are further steps. In this way, the video generator 126 may create at least one frame for the execution of each step in the flowchart 122 flow to show the execution of the program statements resulting in the errors in the order of the timestamps for the error entries in the log file 112. The video stream 128 is preferably played (at block 332) concurrently while the user is looking at the log file 112 to provide a visual representation of the source code flow of statement to allow the user or developer to better understand the cause of the errors in the log file by the visualization of the source code related to those errors.

With the embodiment of FIGS. 3a and 3b, upon a user selecting error entries of interest in a log file 112, the source code 116 is processed to determine the statements causing the error and a visualization of the source code statements in the form of a flowchart and the statements for the flow chart steps. The visualization of the block of statements where user input is received is provided with an animation of user input to draw user attention to the section of statements receiving user input because many errors that occur may be the result of user input as opposed to an error or bug in the source code 116. Further, since computer users are accustomed to watching video presentations of technical solutions and fixes, this real-time generation of a video showing the code flow that resulted in the selected errors will help users better understand the sources of errors in code execution.

In further embodiments, a developer can visualize the animated video 128 with a virtual reality interface and interact with the objects created in the virtual reality environment to further view source code statements or run time parameters by selecting steps in the flowchart 122 rendered in the video to reproduce the problem in a virtual reality environment.

In a further embodiment, there may be tiers of log files, such as an application tier, a database tier, etc., such as when an application issues database queries to interact with the database. In such case, the user may select errors from multiple tiers of log files, and the flowchart 122 may depict steps across multiple tiers to provide a visualization of the code related to the selected errors in the separate tier log files for separate program tiers, such as database tier, application tier, network tier, etc. The described embodiments may create co-relation between different tier logs files from different tiers using the log type and timestamp analysis. The user can select the logs from one tier and navigate to the corresponding related logs for that issue in another tier seamlessly using interactions with the video, such as with a virtual reality interface.

In a further embodiment, a knowledge corpus may be created based on the errors in a log file 112, such as root cause analysis, remediation, etc. The knowledge corpus may be created based on the historically captured data from the application. The information in the knowledge corpus may be reproduced in the video upon determining knowledge corpus analysis and suggestions that relate to errors in the log file and the corresponding blocks of statements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
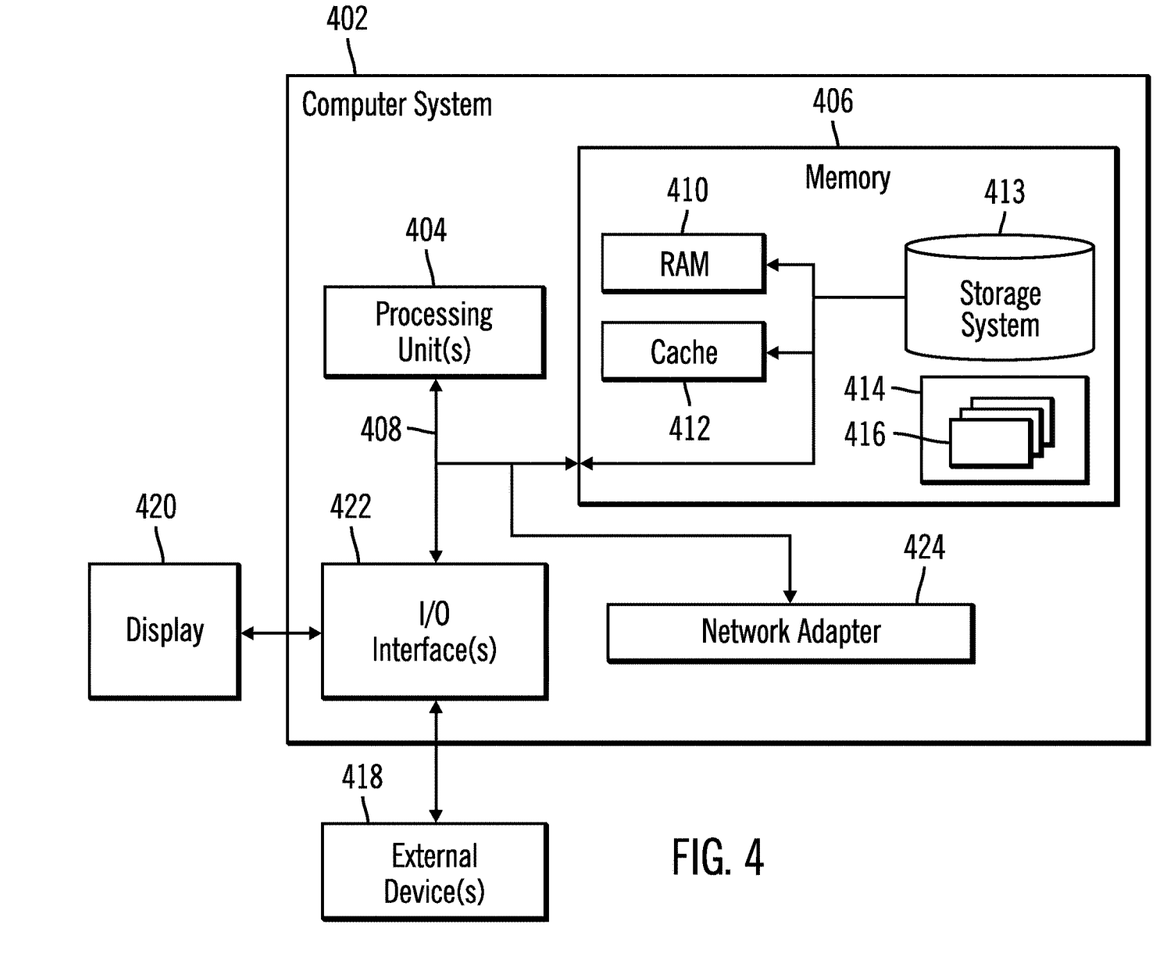
FIG. 4 illustrates a computing environment in which the components of FIG. 1 may be implemented

The computational components of FIG. 1, including the computer system 100, may be implemented in one or more computer systems, such as the computer system 402 shown in FIG. 4. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 402 may be implemented as program modules 416 which generally carry out the functions and/or methodologies of embodiments of the invention as described herein. The systems of FIG. 1 may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing a visualization of errors in program code, the computer program product comprising a computer readable storage medium having computer readable instructions embodied therein that is executable to perform operations, the operations comprising:
   providing a log file indicating errors logged during execution of program code;
   analyzing source code from which the program code is compiled to determine blocks of statements in the source code that when executed resulted in the errors indicated in the log file;
   annotating the blocks of statements in the source code with information on the errors indicated in the log file resulting from the execution of the blocks of statements, wherein the information for the annotated blocks of statements maps the errors in the log file to the blocks of statements in the source code;
   processing the annotated blocks of statements to determine whether at least one of the annotated blocks of statements results in a logged error that received user input;
   capturing a screen shot of a user interface in which a user entered user input in response to determining at least one of the annotated blocks of statements resulted in the logged error that received the user input; and
   generating a video providing a visualization of the annotated blocks of statements in the source code and the captured screen shot of the user interface, wherein the visualization renders an animation, which represents the received user input, adjacent to the annotated block of statements.

2. The computer program product of claim 1, wherein the log file indicates timestamps at which the errors in the log file occurred, wherein the analyzing the source code comprises determining an order in which the annotated blocks of statements in the source code were executed to produce the errors in the log file, wherein the order is based on the timestamps of the errors, and wherein the annotated blocks of statements are visualized in the video in the order in which the annotated blocks of statements were executed to produce the errors in the log file.

3. The computer program product of claim 1, wherein the animation representing the user input comprises rendering the captured screen shot of the user interface with the visualization of the determined at least one of the annotated blocks of statements.

4. The computer program product of claim 1, wherein the animation representing the user input comprises rendering an animation of a person with the visualization of the determined at least one of the annotated blocks of statements.

5. The computer program product of claim 1, wherein the generating the video providing the visualization of the annotated blocks of statements comprises:
   generating a flowchart having steps showing a flow of the annotated blocks of statements; and
   generating frames in the video highlighting the steps in the flowchart in different frames to show a flow of execution of the steps in the flowchart.

6. The computer program product of claim 1, wherein the visualization in the video comprises first frames rendering an animation of proceeding through steps in a flowchart corresponding to the annotated blocks of statements and second frames rendering an animation of user input with at least one of the annotated blocks of statements producing at least one of the errors corresponding to the steps in the first frames of the flowchart.

7. The computer program product of claim 6, wherein the second frames render a graphic representing a person with the at least one of the annotated blocks of statements that receives the user input and causes the at least one of the errors in the log file.

8. The computer program product of claim 1, wherein the program code executes on multiple tiers, wherein the tiers have separate tier log files indicating errors that occur when executing code in the tiers, wherein the tier log files indicate timestamps at which the errors in the tier log files occurred, wherein the analyzing the source code comprises determining an order in which the blocks of statements in source code for the tiers were executed to produce the errors in the tier log files, wherein the order is based on the timestamps of the errors in the tier log files, wherein the annotated blocks of statements are visualized in the video in the order in which the annotated blocks of statements were executed across the tiers to produce the errors in the tier log files.

9. The computer program product of claim 1, wherein the operations further comprise:
   receiving user selection of a group of errors in the log file, wherein the determining the blocks of statements in the source code comprises determining blocks of statements in the source code resulting in the selected group of errors, wherein the annotating the blocks of statements comprises annotating the determined blocks of statements resulting in the selected group of errors, wherein the video provides a visualization of the determined blocks of statements resulting in the selected group of errors in the log file.

10. A system for providing a visualization of errors in program code, comprising:
a processor; and
a computer readable storage medium having computer readable instructions embodied therein that when executed by the processor performs operations, the operations comprising:
providing a log file indicating errors logged during execution of program code;
analyzing source code from which the program code is compiled to determine blocks of statements in the source code that when executed resulted in the errors indicated in the log file;
annotating the blocks of statements in the source code with information on the errors indicated in the log file resulting from the execution of the blocks of statements, wherein the information for the annotated blocks of statements maps the errors in the log file to the blocks of statements in the source code;
processing the annotated blocks of statements to determine whether at least one of the annotated blocks of statements results in a logged error that received user input;
capturing a screen shot of a user interface in which a user entered user input in response to determining at least one of the annotated blocks of statements resulted in the logged error that received the user input; and
generating a video providing a visualization of the annotated blocks of statements in the source code and the captured screen shot of the user interface, wherein the visualization renders an animation, which represents the received user input, adjacent to the annotated block of statements.

11. The system of claim 10, wherein the log file indicates timestamps at which the errors in the log file occurred, wherein the analyzing the source code comprises determining an order in which the annotated blocks of statements in the source code were executed to produce the errors in the log file, wherein the order is based on the timestamps of the errors, and wherein the annotated blocks of statements are visualized in the video in the order in which the annotated blocks of statements were executed to produce the errors in the log file.

12. The system of claim 10, wherein the visualization in the video comprises first frames rendering an animation of proceeding through steps in a flowchart corresponding to the annotated blocks of statements and second frames rendering an animation of user input with at least one of the annotated blocks of statements producing at least one of the errors corresponding to the steps in the first frames of the flowchart.

13. The system of claim 10, wherein the operations further comprise:
receiving user selection of a group of errors in the log file, wherein the determining the blocks of statements in the source code comprises determining blocks of statements in the source code resulting in the selected group of errors, wherein the annotating the blocks of statements comprises annotating the determined blocks of statements resulting in the selected group of errors, wherein the video provides a visualization of the determined blocks of statements resulting in the selected group of errors in the log file.

14. A method for providing a visualization of errors in program code, comprising:
providing a log file indicating errors logged during execution of program code;
analyzing source code from which the program code is compiled to determine blocks of statements in the source code that when executed resulted in the errors indicated in the log file;
annotating the blocks of statements in the source code with information on the errors indicated in the log file resulting from the execution of the blocks of statements, wherein the information for the annotated blocks of statements maps the errors in the log file to the blocks of statements in the source code;
processing the annotated blocks of statements to determine whether at least one of the annotated blocks of statements results in a logged error that received user input;
capturing a screen shot of a user interface in which a user entered user input in response to determining at least one of the annotated blocks of statements resulted in the logged error that received the user input; and
generating a video providing a visualization of the annotated blocks of statements in the source code and the captured screen shot of the user interface, wherein the visualization renders an animation, which represents the received user input, adjacent to the annotated block of statements.

15. The method of claim 14, wherein the log file indicates timestamps at which the errors in the log file occurred, wherein the analyzing the source code comprises determining an order in which the annotated blocks of statements in the source code were executed to produce the errors in the log file, wherein the order is based on the timestamps of the errors, and wherein the annotated blocks of statements are visualized in the video in the order in which the annotated blocks of statements were executed to produce the errors in the log file.

16. The method of claim 14, wherein the visualization in the video comprises first frames rendering an animation of proceeding through steps in a flowchart corresponding to the annotated blocks of statements and second frames rendering an animation of user input with at least one of the blocks of statements producing at least one of the errors corresponding to the steps in the first frames of the flowchart.

17. The method of claim 14, further comprising:
receiving user selection of a group of errors in the log file, wherein the determining the blocks of statements in the source code comprises determining blocks of statements in the source code resulting in the selected group of errors, wherein the annotating the blocks of statements comprises annotating the determined blocks of statements resulting in the selected group of errors, wherein the video provides a visualization of the determined blocks of statements resulting in the selected group of errors in the log file.

* * * * *